(12) United States Patent
Hetzler et al.

(10) Patent No.: US 10,372,334 B2
(45) Date of Patent: Aug. 6, 2019

(54) RECLAIMING FREE SPACE IN A STORAGE SYSTEM

(71) Applicant: International Business Machines Corporation, Armonk, NY (US)

(72) Inventors: Steven R. Hetzler, Los Altos, CA (US); Wayne C. Hineman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 15/042,014

(22) Filed: Feb. 11, 2016

(65) Prior Publication Data

US 2017/0235672 A1    Aug. 17, 2017

(51) Int. Cl.
   *G06F 3/06*    (2006.01)
(52) U.S. Cl.
   CPC ............ G06F 3/0608 (2013.01); G06F 3/067 (2013.01); G06F 3/0652 (2013.01)
(58) Field of Classification Search
   CPC ............ G06F 12/00; G06F 12/08; G06F 7/06
   USPC ......................................... 711/100, 117, 118
   See application file for complete search history.

(56) References Cited

U.S. PATENT DOCUMENTS

| | | | |
|---|---|---|---|
| 6,351,838 B1 | 2/2002 | Amelia | |
| 6,393,516 B2 | 5/2002 | Johnson et al. | |
| 7,734,643 B1 | 6/2010 | Waterhouse et al. | |
| 7,822,887 B2 | 10/2010 | Torabi et al. | |
| 7,930,611 B2 | 4/2011 | Huang et al. | |
| 7,932,910 B2 | 4/2011 | Hansen et al. | |
| 8,364,633 B2 | 1/2013 | Aahlad et al. | |
| 8,458,287 B2 | 6/2013 | Ozzie et al. | |
| 8,738,855 B2 | 5/2014 | De Spiegeleer et al. | |
| 8,914,513 B2 | 12/2014 | Dutta et al. | |
| 9,229,810 B2 | 1/2016 | He et al. | |

(Continued)

FOREIGN PATENT DOCUMENTS

| | | |
|---|---|---|
| EP | 1343087 A2 | 9/2003 |
| EP | 2273683 A2 | 1/2011 |
| WO | 0073906 A1 | 12/2000 |

OTHER PUBLICATIONS

List of IBM Patents or Patent Applications Treated as Related Form.

(Continued)

*Primary Examiner* — Tuan V Thai
(74) *Attorney, Agent, or Firm* — Sherman IP LLP; Kenneth L. Sherman; Steven Laut (57) ABSTRACT

One embodiment provides a method for reclaiming free space. The method comprises selecting a first blob for reclamation from a first data center; sending a first message to a second data center indicating the first blob is to be reclaimed; sending a second message to the second data center after reclaiming the first blob; receiving a global reclamation complete message from the second data center; reading at least one data set from the first blob; and storing in a write buffer the at least one data set for encoding into a erasure code group in an alternative blob in the first data center. Further, upon receipt of the global reclamation message from the second data center, indicating the first blob is free in the map in the first data center. In one embodiment, selecting the first blob is based on the map indicating free space in the first data center.

10 Claims, 9 Drawing Sheets

(56) References Cited

U.S. PATENT DOCUMENTS

| | | | |
|---|---|---|---|
| 9,244,761 | B2 | 1/2016 | Yekhanin et al. |
| 9,400,620 | B2 | 7/2016 | Miyamae |
| 9,613,656 | B2 | 4/2017 | Cohen et al. |
| 2002/0194340 | A1 | 12/2002 | Ebstyne et al. |
| 2005/0125411 | A1* | 6/2005 | Kilian ............... G06F 17/30551 |
| 2008/0222481 | A1 | 9/2008 | Huang et al. |
| 2009/0049050 | A1 | 2/2009 | Whitehead |
| 2010/0106695 | A1* | 4/2010 | Calder ............... G06F 17/3033 707/696 |
| 2010/0106734 | A1* | 4/2010 | Calder ............. G06F 17/30011 707/758 |
| 2012/0084506 | A1 | 4/2012 | Colgrove et al. |
| 2012/0131383 | A1 | 5/2012 | Galloway et al. |
| 2012/0198195 | A1 | 8/2012 | Wylie |
| 2014/0215209 | A1 | 7/2014 | Chacko |
| 2014/0380125 | A1 | 12/2014 | Calder et al. |
| 2015/0020172 | A1 | 1/2015 | Bohnenberger et al. |
| 2015/0154418 | A1 | 6/2015 | Redberg |
| 2015/0286564 | A1* | 10/2015 | Lim ..................... G06F 12/023 711/159 |
| 2016/0034354 | A1* | 2/2016 | Hashimoto ........... G06F 11/108 714/764 |
| 2016/0380650 | A1 | 12/2016 | Calder et al. |
| 2017/0220415 | A1* | 8/2017 | Hashimoto ......... G06F 11/1068 |

OTHER PUBLICATIONS

Li, M. et al., "Toward I/O-Efficient Protection Against Silent Data Corruptions in RAID Arrays", Proceedings of the 30th Symposium on In Mass Storage Systems and Technologies (MSST), Jun. 2-6, 2014, pp. 1-2, IEEE, United States.

Mell, P., et al., "The NIST Definition of Cloud Computing", National Institute of Standards and Technology Special Publication 800-145, Sep. 2011, pp. 1-7, U.S. Department of Commerce, United States.

List of IBM Patents or Patent Applications Treated as Related; Hetzler, S., et al., U.S. Appl. No. 16/399,838, filed Apr. 30, 2019.

* cited by examiner

RECLAIMING FREE SPACE IN A STORAGE SYSTEM

The present invention generally relates to a method for efficiently managing data on a resilient distributed data storage system.

BACKGROUND

Protecting against data center loss in a data storage system is most commonly achieved using data replication. Data is written to a first data center, then copied to one or more data centers for protection. With two data centers, the system is protected against the loss of any one data center. Typical configurations use three data centers, as they rely on the replication to protect against certain failures local to a data center. With three data centers, data is protected against the concurrent loss of one data center and one further error in one of the remaining data centers. Such a system is expensive, as it multiplies the storage and network capacity required. Another prior method for protection is to use an erasure code spread across the data centers. Some examples include symmetric code, such as 6+6P (6 data and 6 parity) and 7+5P (7 data and 5 parity). Data in a first data center is encoded locally into the erasure code, and the spread across the data centers. Both 6+6P and 7+5P have 12 storage elements in a code stripe. These can be spread across 3 data centers by placing 4 elements on each data center. Both of these codes are more efficient than replication, but have a significant performance impact. Data is encoded into the stripe in a first data center, a subset of the elements are stored on the first data center, and the remaining subsets are stored on the other data centers. This means that data is not protected against any type of loss (local or data center) until the entire code stripe is stored. This synchronous process uses WAN bandwidth for every write and suffers from round-trip latency. Further, such erasure codes provide very limited protection in cloud environments. They suffer from long reconstruct/rebuild times as such recovery requires data be transferred over the WAN. Cloud systems operate at very large scale, and there are large numbers of storage components in each data center. Thus, the probability of a data center having some component failed, off line or otherwise unavailable is very high. It is therefore critical to have strong local protection in addition to data center loss protection.

SUMMARY

Embodiments of the invention relate to a system comprising a computer processor, a computer-readable hardware storage device, and program code embodied with the computer-readable hardware storage device for execution by the computer processor to implement a method comprising selecting a blob for reclamation from a first data center; wherein the blob comprises a plurality of erasure code groups to minimize read, modify and modify activity within the erasure code group, and sending a first message to one or more second data centers indicating the blob is to be reclaimed. The method further comprising sending a second message to the one or more second data centers after reclaiming the blob in the first data center, and receiving a global reclamation complete message from the one or more second data centers; the global reclamation complete message being sent in response to the one or more second data centers receiving a local reclamation complete message from a third data center. Reclaiming comprising reading at least one data set from the blob and storing in a write buffer in the first data center the at least one data set for encoding into a erasure code group in an alternative blob in the first data center. Upon receipt of the global reclamation message from the second data center, the method continues by indicating the blob is free in the map in the first data center. After indicating the blob is free in the map in the first data center, the method continues by sending to the one or more second data centers the map indicating free space in the first data center. Selecting the first blob is based on one of: the map indicating free space in the first data center, a total amount of free space of all blobs across all data centers, or a free space rank of all blobs across all data centers.

In another embodiment, a method for reclaiming free space in a storage system comprises selecting a first blob for reclamation from a first data center, and sending a first message to a second data center indicating the first blob is to be reclaimed. In this embodiment, the storage system comprises a plurality of data centers, each data center maintains a local erasure code and a map of data stored locally therein, and the plurality of data centers is protected by a global erasure code distributed across all blobs across all data centers. The method further comprises sending a second message to the second data center after reclaiming the first blob, and receiving a global reclamation complete message from the second data center. The global reclamation complete message indicates a second blob in the second data center has been reclaimed; the second blob comprising data associated with data in the first blob. Reclaiming comprises reading at least one data set from the first blob, and storing in a write buffer the at least one data set for encoding into an erasure code group in an alternative blob in the first data center. The method further comprises indicating the first blob is free in the map in the first data center upon receipt of the global reclamation message from the second data center and then sending to the second data center the map indicating free space in the first data center.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
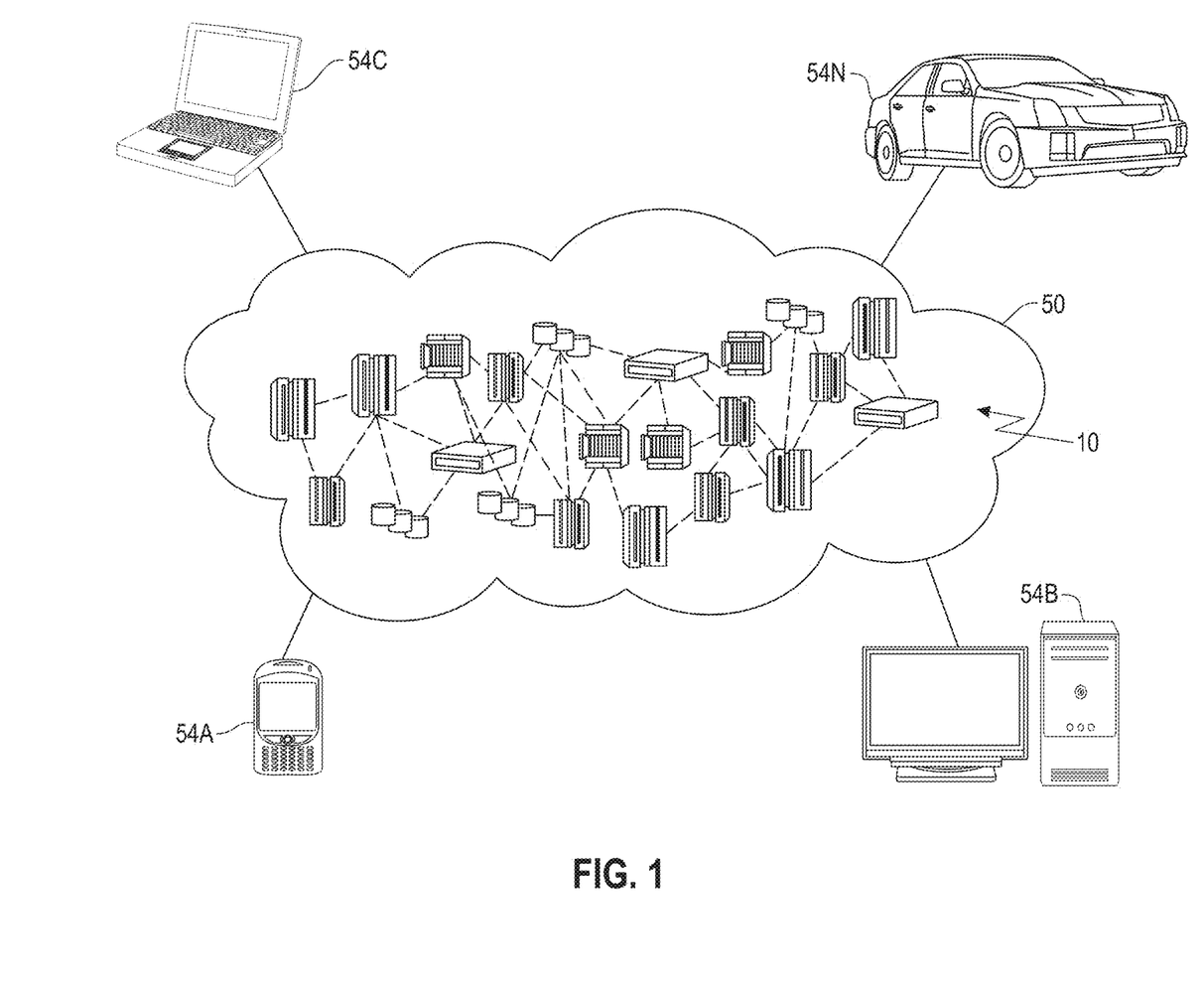
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
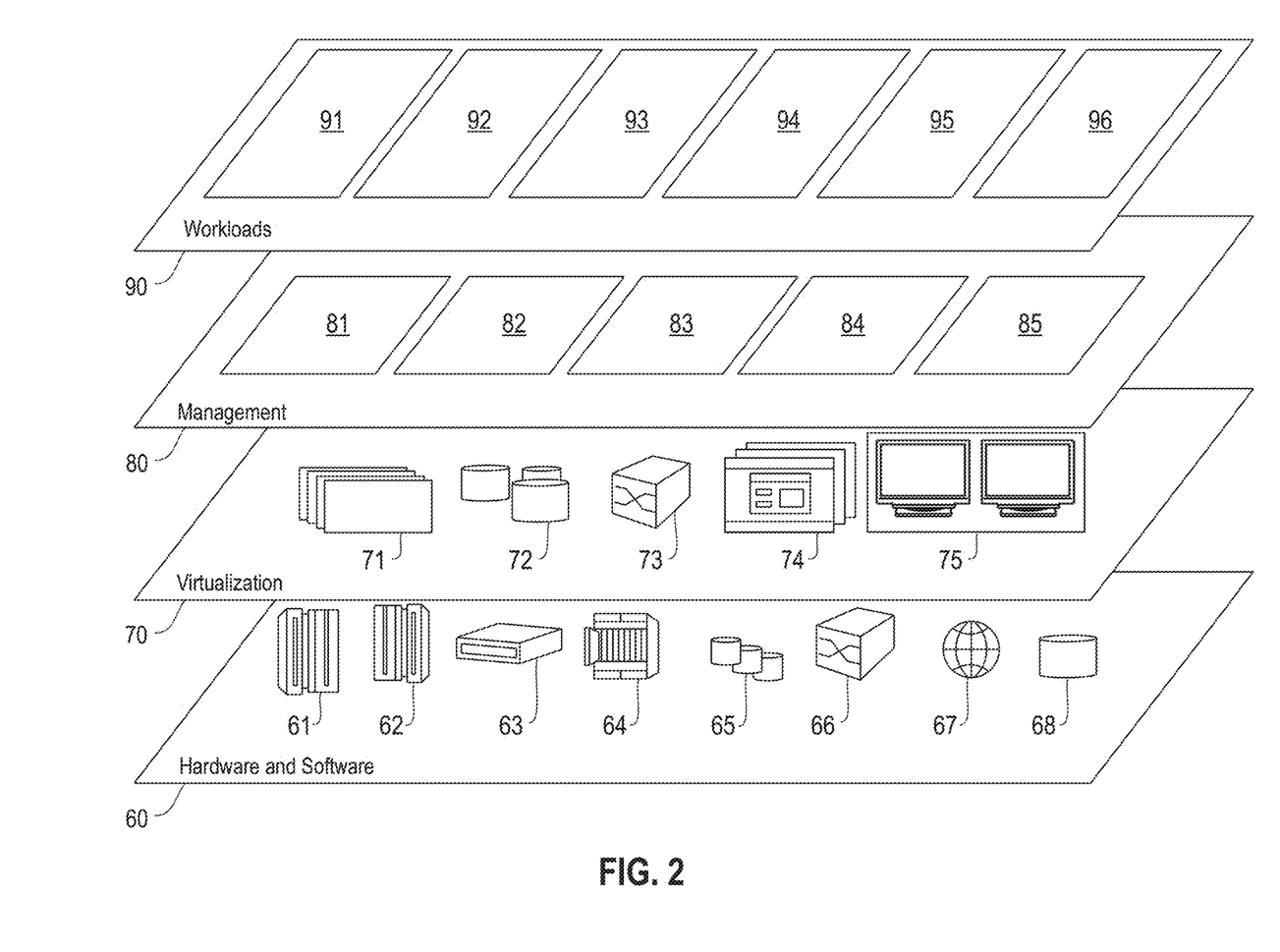
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and verifying historical artifacts in disparate source control systems 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), or performed by the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
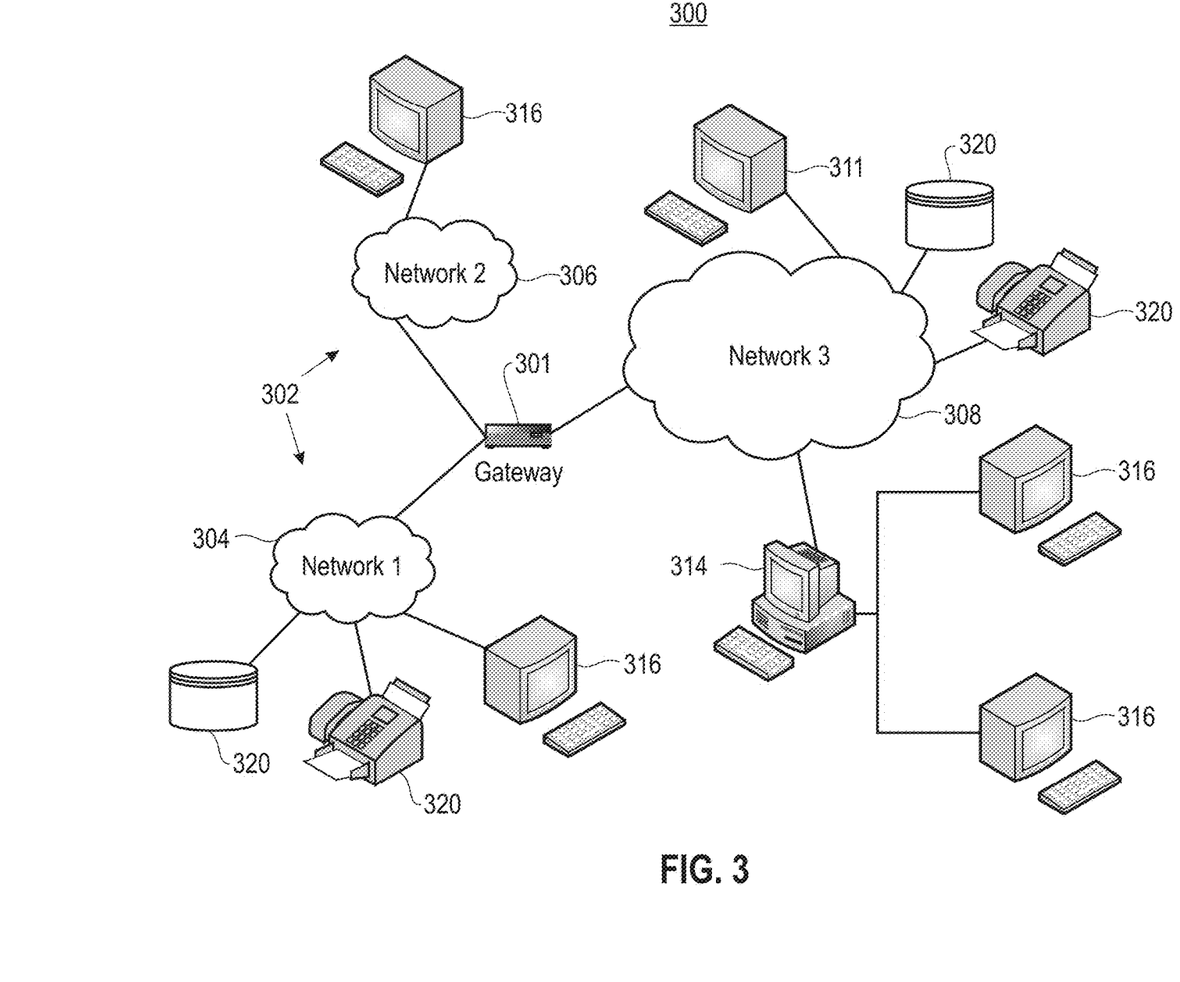
FIG. 3 is a network architecture for verifying historical artifacts in disparate source control systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
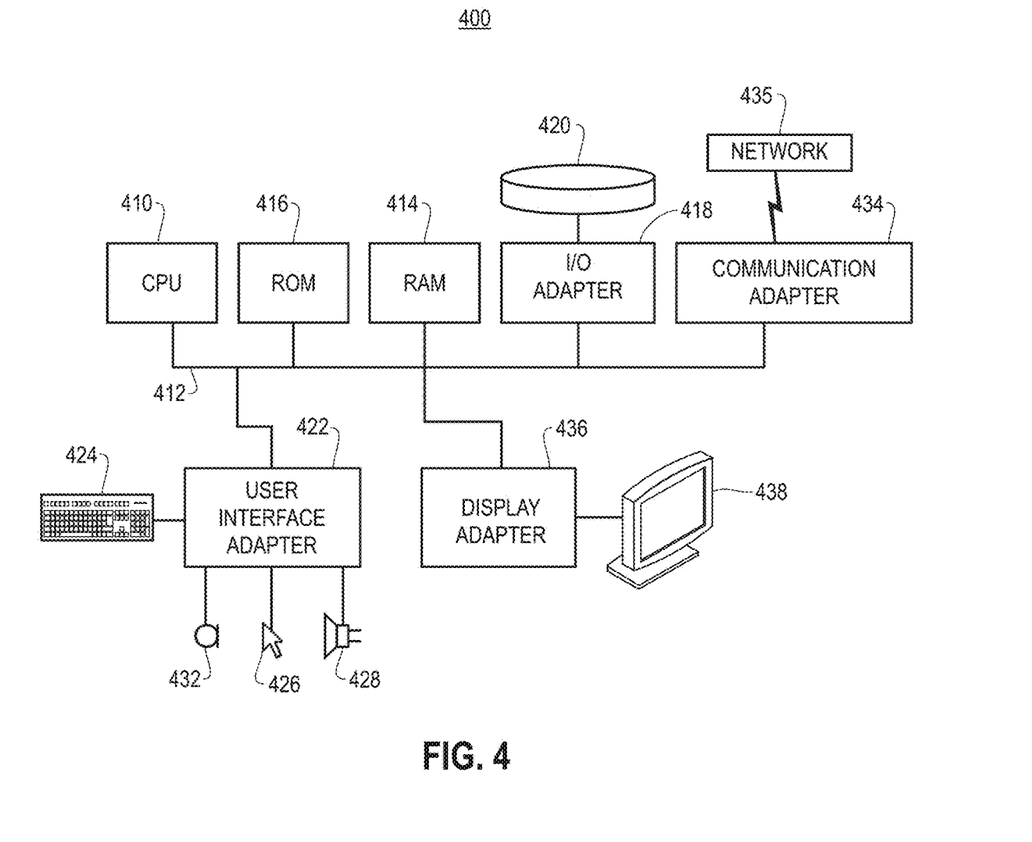
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
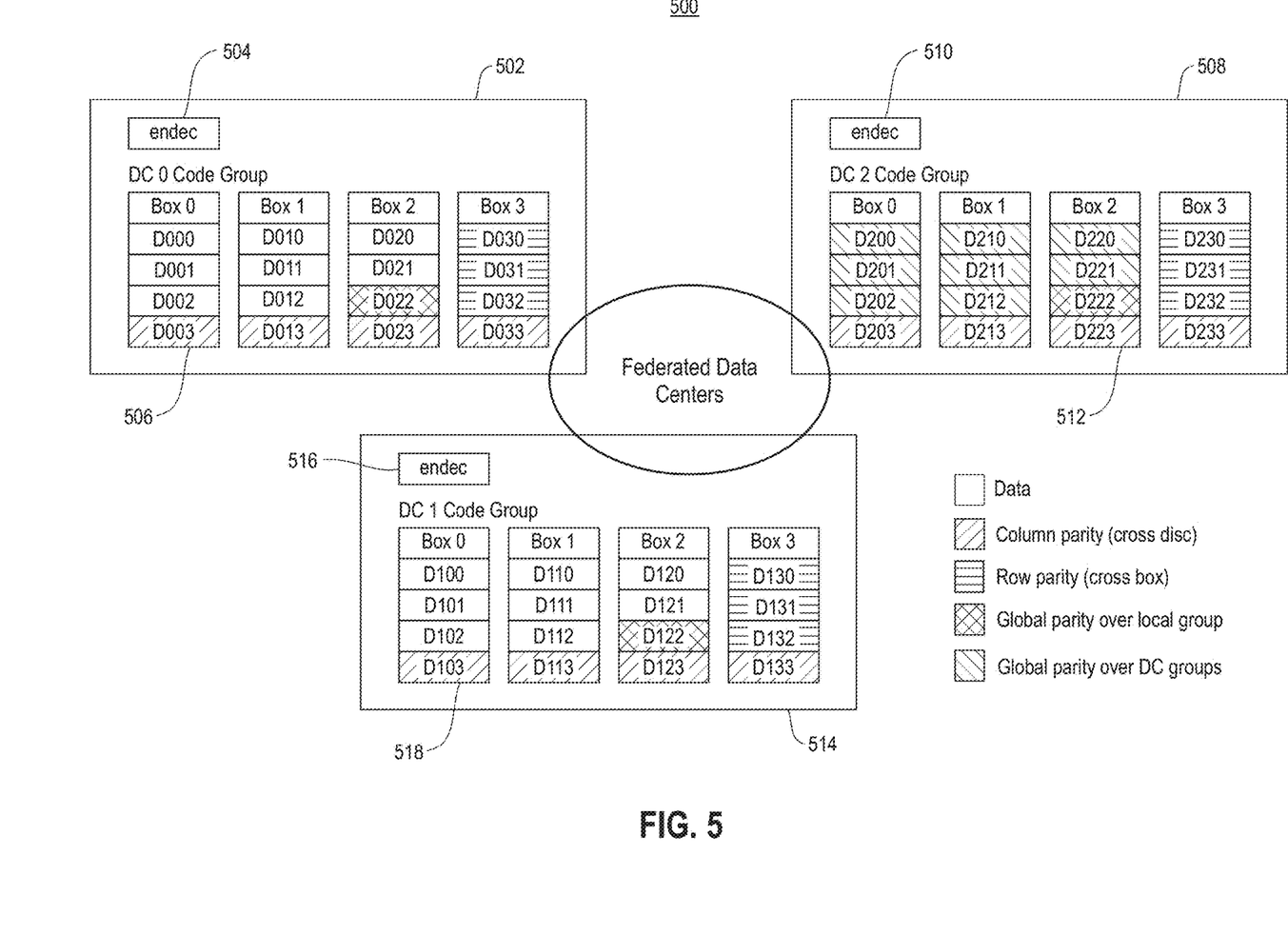
FIG. 5 shows a representative distributed data storage system, according to one embodiment.

FIG. 5 shows a representative distributed data storage system 500, according to one embodiment. The system 500 illustrates a set of federated data centers 502, 508 and 514, protected by local and global erasure codes. In one embodiment, the global erasure code has data sets on two of the data centers, and parity sets on the third data center forming the global erasure code. While FIG. 5 details three data centers 502, 508 and 514, two or more data centers is the preferred embodiment. Any number of data centers can hold the parity sets so long as there is at least one data center which has data sets. Each data center also protects the local data sets with additional parity information, forming the local erasure codes. Each data center has its own encoder/decoder 504, 510 and 516, for managing the local and global codes and handling associated state information.

The data storage centers 502, 508 and 514 are connected over a network, such as a WAN. Each data storage center includes a plurality of data units 506, 512 and 518, shown as boxes labeled "Dxxx" where "x" identifies a numerical value of a particular unit (e.g., D233). The data units 506, 512 and 518 are further grouped into sets labeled "Box n." These indicate some common failure domain in the data center, such as a JBOD (just a bunch of discs), or a rack, etc. As shown in FIG. 5, a layer of protection local to each data storage center is present. In this embodiment, these are first-responder-type erasure codes. The row, columns and global parities provide protection for local data failures. The data units 506, 512 and 518 are protected against data storage center failure by a cross-data-center code, such as parity.

A unit of garbage collection is called a blob. In general, a blob is a plurality of erasure code groups in order to minimize the read/modify/write activity within an erasure code group. Further, blob structures works well with log structured data layouts, such as might be employed by an object storage. In FIG. 5, there are 8 data sets in a local code group (Dx00, Dx01, Dx02, Dx10, Dx11, Dx12, Dx20 and Dx21) forming the garbage collection blob. In general, there can be more than one local code group in a blob.

Figure 6:
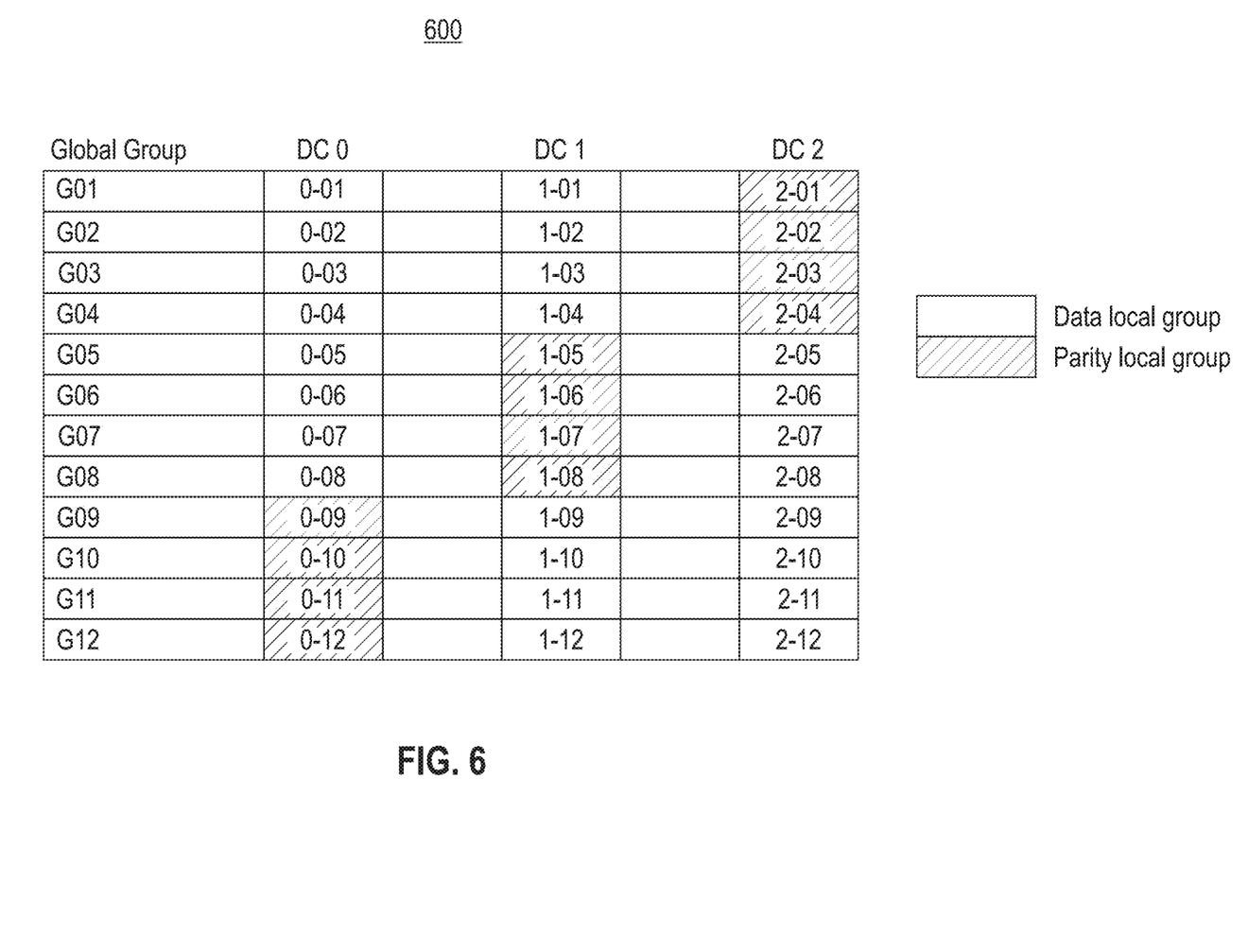
FIG. 6 shows an exemplar set of erasure code groups distributed across three data centers, according to one embodiment.

FIG. 6 shows an exemplar set of erasure code groups 600 distributed across three data centers 502, 508, 514 (see FIG. 5), according to one embodiment. The set of erasure code groups spread across 3 data centers using global parity rotation. Each column (DC0, DC1, DC2) shows data sets for a single data center, and each row shows the data sets belonging to each global group. For example, data sets 0-01 and 1-01 are data sets in global group G01, whereas data set 2-01 holds an associated parity. It is important that garbage collection for a given data center does not disrupt the global parity group, which could lead to data loss exposure. Thus, the system requires garbage collection operations maintain the integrity of parity groups. However, it is also important to minimize the impact of maintaining this integrity.

One embodiment uses a cooperative method to maintain the integrity of the global code groups while minimizing the associated write amplification. Each data center maintains a garbage collection blob list including the local blob occupancy. Global parity groups do not require such information as the global parity groups do not hold any data. For log structured systems, such as object stores, data in a blob may be deleted, but not updated in place. In such situations the blob occupancy map need not be fully up to date, although it is beneficial. Blob occupancy maps are asynchronously shared by the data centers, such as by periodic or on-demand updates. Non-local blob maps may be somewhat out of date without any adverse impact on integrity of the system.

Each data center can determine the need for garbage collection independently, but needs to inform other data centers which local blobs are being collected. When a blob is garbage collected, the occupied data sets are read from the storage media and placed into the local data center's write stream for encoding into a different local erasure code group than its original one. The local group is then marked as unoccupied (e.g., no active data, but held for global parity). The other data centers in the system are informed that the local garbage collection is complete. The other data centers collect their local blobs associated with the global group, and inform the parity data center when complete. The parity data center, in turn, collects the completion messages from the other data centers. Once the parity data center receives all of the completion notices, it can mark the local parity group associated with the global group as freed, and inform the other data centers that they may now mark the associated local groups as free. At this point, the entire global group of blobs has been garbage collected.

Alternative embodiments exist for selecting blobs for garbage collection. Having access to the blob occupancy maps for all the data centers allows for global optimization of the selection process. Such access may be provided by having asynchronous exchange of blob occupancy maps between the data centers. It is not necessary for the global blob information to be up to date in all the data centers. Out of date global blob information may lead to suboptimal selection of a blob(s) for garbage collection, but the impact to the system should be minimal. In one embodiment, the blob map information is exchanged by sending the map (or just updates) to other data centers at pre-defined intervals. In another embodiment, blob map exchange can be performed at the beginning of garbage collection.

Figure 7:
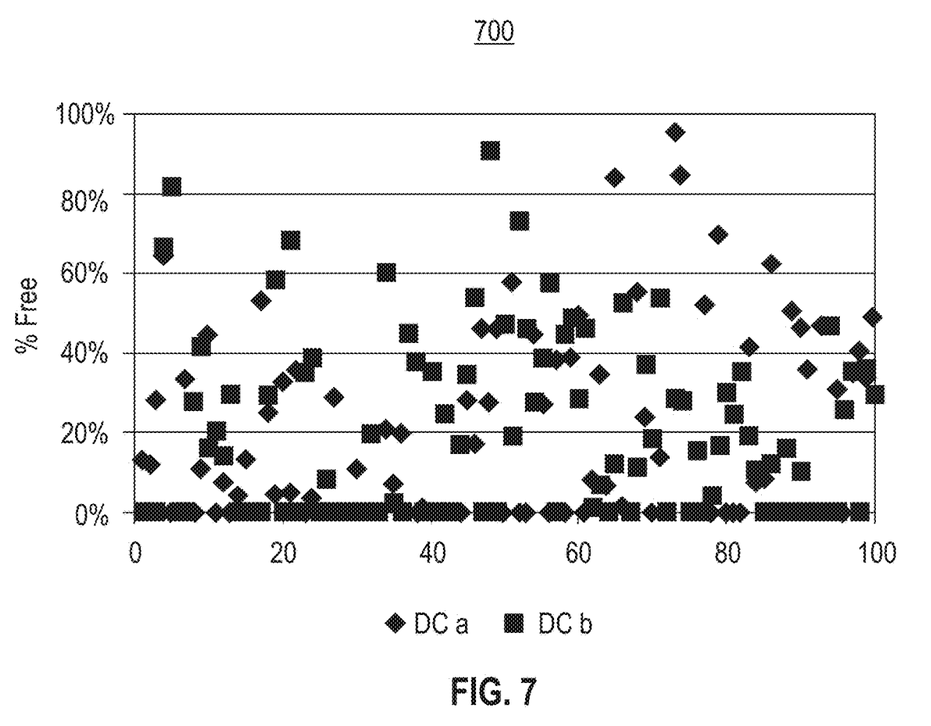
FIG. 7 shows the results of a Monte-Carlo simulation of blob occupancy, according to an embodiment.

FIG. 7 shows the results 700 of a Monte-Carlo simulation of blob occupancy, according to an embodiment. Specifically, FIG. 7 details the results of a Monte-Carlo simulation of blob occupancy for a set of 100 blobs on two different data centers. The x-axis details the number of blobs while the y-axis details the percentage of invalidated data in the blobs. As shown in FIG. 7, the mean occupancy is about eighty percent (80%) for both data centers, with about forty percent (40%) of the blobs fully (100%) occupied.

Figure 8:
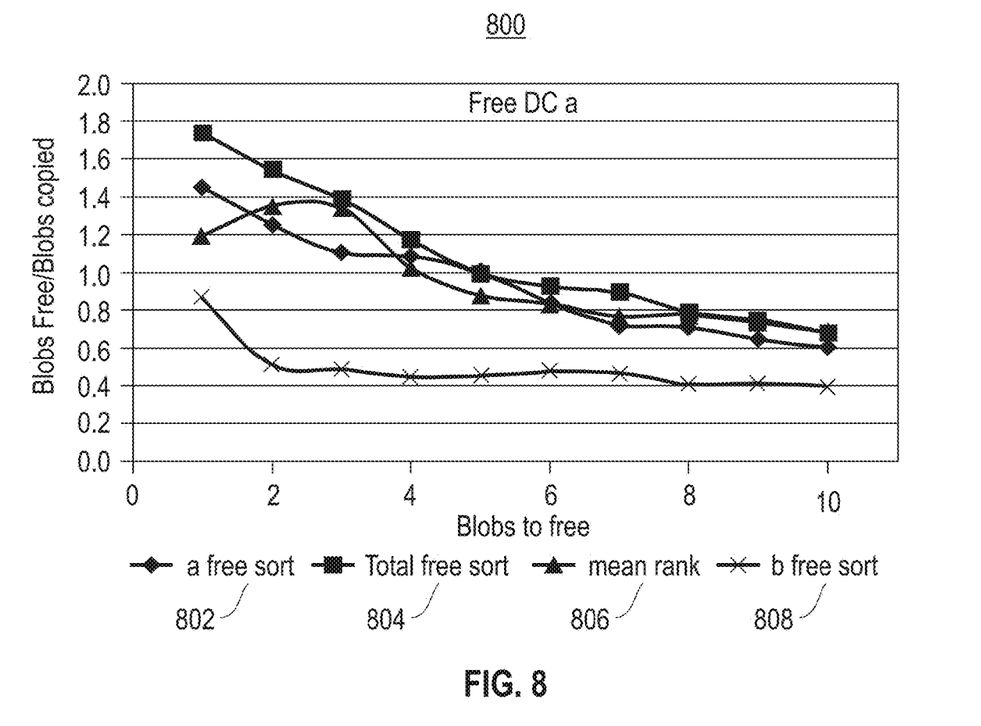
FIG. 8 shows the efficiency resulting from different approaches to choosing a blob for garbage collection, according to an embodiment.

FIG. 8 shows the efficiency resulting from different approaches 800 to choosing a blob for garbage collection, according to an embodiment. In FIG. 8 it is assumed that a given number of free blobs in data center is needed (the x-axis). The y-axis details the ratio of blobs freed to blobs copied (which is related to the write amplification) with higher values indicate lower write amplification. The curve labeled "a free sort" 802 is for a method of selecting the blobs in data center a with the most free space, without regard to the free space distribution in data center b. The curve runs from freeing 1 blob of space to 10 blobs of space.

The curve labeled "total free sort" 804 is for a method of computing the total free space for all the blobs in a group, and selecting those blobs with the most total free space. Referring to FIG. 6, the total free space for group G01 would be the sum of the free space in 0-01 and 1-01. As can be seen, this method 804 is often more efficient than using only the local information.

The curve labeled "mean rank" 806 is a method of sorting the blobs in order of free space for each data center, then computing a mean rank for each blob as the average of the ranks of each of the data centers. The blobs with the best mean rankings are selected for garbage collection. According to FIG. 8, "mean rank" 806 is somewhat better than the "a free sort" 802 method, and appears somewhat worse overall than the "total free sort" method 804.

The curve labeled "b free sort" 808 is the result of a method of selecting the blobs in data center b with the most free space. This is essentially random order for data center a, thus it is not surprising that it has the worst behavior. While the simulations 800 are not expected to be accurate in detail, FIG. 8 highlights the benefits of using global information as part of the blob selection mechanism.

If a data center is down (or out of communication), garbage collection may still proceed. In such a scenario, the remaining data centers proceed, maintaining the state information as needed. If the parity data center is down and/or out of communication with the remaining data centers, the messages intended for the parity data center must be held until the missing data center returns. If the missing data center needs to be reconstructed, garbage collect proceeds as part of this process. For example, if the free space pressure is too high on a given data center, a new parity group can be allocated on another data center, and the garbage collection can continue.

Figure 9:
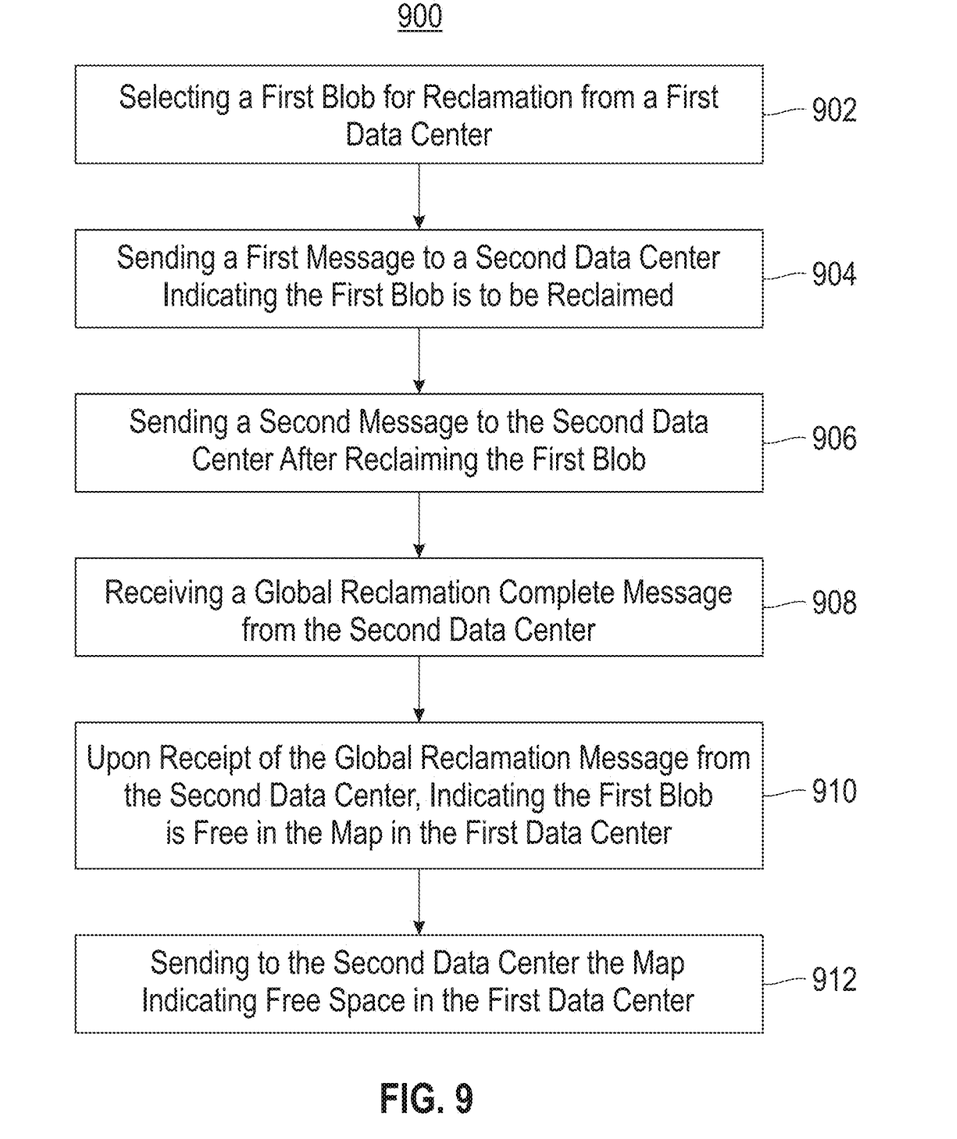
FIG. 9 illustrates a block diagram for a method for reclaiming free space in a storage system, according to one embodiment.

FIG. 9 illustrates a block diagram for a method 900 for reclaiming free space in a storage system, according to one embodiment. The method 900 begins with block 902 with selecting a first blob for reclamation from a first data center. After selecting the blob for reclamation, the method 900 continues with block 904, sending a first message to a second data center indicating the first blob is to be reclaimed. The method 900 continues with block 906 with sending a second message to the second data center after reclaiming the first blob in the first data center.

Upon completion of block 906, the method 900 continues with block 908, receiving a global reclamation complete message from the second data center. After receiving the global reclamation complete message, the method 900 continues with block 910 which indicates the first blob is free in the map in the first data center. Indication is performed upon receipt of the global reclamation message from the second data center. After block 910, the method 900 continues with block 912, sending the second data center the map indicating free space in the first data center.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reclaiming free space in a storage system, comprising:
    selecting a first blob for reclamation from a first data center;
    sending a first message to a second data center indicating the first blob is to be reclaimed;
    reclaiming the first blob from the first data center;
    sending a second message to the second data center after reclaiming the first blob; and
    receiving a global reclamation complete message from the second data center;
    wherein:
        the global reclamation complete message indicates a second blob in the second data center has been reclaimed;
        the second blob comprising data associated with data in the first blob;
        the storage system comprises a plurality of data centers;
        each data center maintains a local erasure code and a map of data stored locally therein; and
        the plurality of data centers is protected by a global erasure code distributed across all blobs across all data centers.

2. The method of claim 1, wherein reclaiming comprises:
    reading at least one data set from the first blob; and
    storing in a write buffer the at least one data set for encoding into an erasure code group in an alternative blob in the first data center.

3. The method of claim 1, further comprising:
    upon receipt of the global reclamation message from the second data center, indicating the first blob is free in the map in the first data center.

4. The method of claim 3, further comprising:
    sending to the second data center the map indicating free space in the first data center.

5. The method of claim 4, wherein:
    selecting the first blob is based on a total amount of free space of all blobs across all data centers.

6. The method of claim 4, wherein:
    selecting the first blob is based on a free space rank of all blobs across all data centers.

7. The method of claim 1, wherein:
    selecting the first blob is based on the map indicating free space in the first data center.

8. A method for reclaiming free space in a storage system, comprising:
    sending a first message to a second data center indicating a first blob is to be reclaimed;
    reclaiming the first blob from the first data center;
    sending a second message to the second data center after reclaiming the first blob; and
    receiving a global reclamation complete message from the second data center, wherein the global reclamation complete message indicates a second blob in the second data center has been reclaimed; the second blob comprising data associated with data in the first blob.

9. The method of claim 8, wherein reclaiming comprises:
reading at least one data set from the first blob;
storing in a write buffer the at least one data set for encoding into an erasure code group in an alternative blob in the first data center;
upon receipt of the global reclamation message from the second data center, indicating the first blob is free in the map in the first data center; and
sending to the second data center the map indicating free space in the first data center.

10. The method of claim 9, wherein: selecting the first blob is based on one of: the map indicating free space in the first data center, a total amount of free space of all blobs across all data centers, or a free space rank of all blobs across all data centers.

\* \* \* \* \*